(12) United States Patent
Erben et al.

(10) Patent No.: US 7,883,058 B2
(45) Date of Patent: Feb. 8, 2011

(54) COMBINED DISPLACEMENT AND SWIVEL MECHANISM

(75) Inventors: Johann Konrad Erben, Hamburg (DE); Jan Wijnia, Espel (NL)

(73) Assignee: Airbus Deutschland GmbH (DE)

(*) Notice: Subject to any disclaimer, the term of this patent is extended or adjusted under 35 U.S.C. 154(b) by 370 days.

(21) Appl. No.: 11/465,966

(22) Filed: Aug. 21, 2006

(65) Prior Publication Data

US 2007/0045472 A1 Mar. 1, 2007

Related U.S. Application Data

(60) Provisional application No. 60/710,715, filed on Aug. 23, 2005.

(30) Foreign Application Priority Data

Aug. 23, 2005 (DE) ................ 10 2005 039 897

(51) Int. Cl.
*B64C 1/14* (2006.01)

(52) U.S. Cl. .............. 244/129.5; 49/246; 49/248; 16/366; 16/370

(58) Field of Classification Search .......... 16/366, 16/370, 288; 49/246–249, 261; 244/129.1, 244/129.4, 129.5
See application file for complete search history.

(56) References Cited

U.S. PATENT DOCUMENTS

| 2,531,263 | A | * | 11/1950 | Fink et al. ............... 182/97 |
| 2,599,834 | A | * | 6/1952 | Jenkins .................... 16/370 |
| 2,882,004 | A | * | 4/1959 | Leishman ............. 248/284.1 |
| 2,931,599 | A | * | 4/1960 | McQuilkin ............ 244/129.6 |
| 3,213,962 | A | * | 10/1965 | Clark, Jr. ................ 182/78 |
| 3,339,226 | A | * | 9/1967 | Brown .................... 16/288 |
| 3,465,991 | A | * | 9/1969 | Banas et al. ............. 244/137.2 |
| 3,791,073 | A | * | 2/1974 | Baker ..................... 49/249 |
| 4,479,622 | A |   | 10/1984 | Howse .................... 244/129 |

(Continued)

FOREIGN PATENT DOCUMENTS

DE 33 05 451 9/1983

(Continued)

*Primary Examiner*—Timothy D Collins
*Assistant Examiner*—Philip J Bonzell
(74) *Attorney, Agent, or Firm*—Ostrolenk Faber LLP

(57) ABSTRACT

The present invention relates to a specially designed hinge mechanism, which makes it possible to construct an aircraft door that can be fitted in a fuselage so as to be displaceable and swivellable on the fuselage. Furthermore, the invention relates to an aircraft door comprising at least one such hinge mechanism designed in this way, to a fuselage with at least one aircraft door that is linked to at least one hinge mechanism, designed in this way, on the fuselage, as well as to the use of at least one hinge mechanism for installation of an aircraft door at a fuselage. The hinge mechanism comprises a first rocker arrangement that is linkable to the aircraft door and that is kinematically designed such that as a result of its activation the aircraft door is displaceable from its home position in the direction of the fuselage; and a second rocker arrangement that is linkable to the fuselage and is kinematically designed such that as a result of its activation the aircraft door can be swivelled out from the fuselage to a final position around a polar axis that is aligned perpendicular to the direction of displacement.

19 Claims, 14 Drawing Sheets

U.S. PATENT DOCUMENTS

| | | | | |
|---|---|---|---|---|
| 4,497,462 | A | * | 2/1985 | Hamatani ................. 244/129.5 |
| 4,510,714 | A | * | 4/1985 | Kasper et al. ................. 49/249 |
| 5,031,863 | A | * | 7/1991 | Noble ..................... 244/129.5 |
| 2007/0045471 | A1 | | 3/2007 | Erben et al. .............. 244/129.4 |

FOREIGN PATENT DOCUMENTS

DE      10 2005 039 846      3/2007

* cited by examiner

COMBINED DISPLACEMENT AND SWIVEL MECHANISM

REFERENCE TO RELATED APPLICATIONS

This application claims the benefit of the filing date of the German Patent Application No. 10 2005 039 897.9 filed Aug. 23, 2005 and of the U.S. Provisional Patent Application No. 60/710,715 filed Aug. 23, 2005, the disclosures of which are hereby incorporated herein by reference.

FIELD OF THE INVENTION

The present invention generally relates to the technical field of kinematics of hinge mechanisms. In particular, the invention relates to a hinge mechanism that is designed such that an aircraft door that can be fitted in a fuselage can displaceably and swivellably be attached to the fuselage. Furthermore, the invention relates to an aircraft door with at least one hinge mechanism designed in this way. Moreover, the invention relates to a fuselage with at least one aircraft door that is linked to the fuselage with at least one hinge mechanism designed in this way, as well as to the use of at least one hinge mechanism for the installation of an aircraft door on a fuselage.

BACKGROUND OF THE INVENTION

Many aircraft comprise doors that can be hinged out of the fuselage, which doors can be hinged from the fuselage by way of a hinge element that is arranged in the foot region of the door. Such hinged doors are, for example, known from larger aircraft such as the A310 (Airbus) or the B767 (Boeing) and also from smaller propeller aircraft such as, for example, the ATR42/72, the Canadair Dash 8, the Bombardier 604 and many smaller short-haul aircraft.

However, the technical implementation of the above-mentioned hinged doors is associated with certain disadvantages in that these doors are, for example, not true "plug-type" doors, which in specialist terminology refers to doors that can be fitted flush to a fuselage and during this fitting procedure automatically lock in a positive-locking manner in the corresponding fuselage aperture. Furthermore, in addition to the door hinge that is present anyway, the known technical implementations of the above-mentioned hinged doors often require additional stabilisation and guide mechanisms such as, for example, braces or cables in order to move the door in a controlled manner from a home position, in which it is fitted flush in the fuselage, to a final position, in which it is completely hinged out of the fuselage. Known hinged doors are thus associated with a certain degree of susceptible technical complexity, for example in the form of additional locking mechanisms or the above-mentioned stabilisation and guide mechanisms for opening and closing, as a result of which the failure probability of the door as well as the accident probability during emergency operation increases.

SUMMARY OF THE INVENTION

Starting from the previously described problems and disadvantages of known hinged doors, in particular of plug-type doors, it is an object of the present invention to state an implementation by means of which the above-described difficulties can at least partly be reduced.

This object is met by a hinge mechanism, by an aircraft door, by a fuselage as well as by the use of at least one hinge mechanism with the features of the independent claims.

The hinge mechanism according to the invention is designed such that an aircraft door that can be fitted in a fuselage can displaceably and swivellably be installed on the fuselage. The hinge mechanism according to the invention essentially comprises a first rocker arrangement and a second rocker arrangement, wherein the first rocker arrangement is linkable to the aircraft door, i.e. is linkable in an articulated manner and is kinematically designed such that as a result of its activation the aircraft door is displaceable from its home position in the direction of the fuselage. In contrast to this the second rocker arrangement is suitable for being linked to the fuselage and is kinematically designed such that as a result of its activation the aircraft door can be swivelled from the fuselage to a final position, on a polar axis that is aligned perpendicular to the direction of displacement. In this arrangement the hinge mechanism according to the invention is designed such that the first rocker arrangement kinematically interacts with the second rocker arrangement in such a way that as a result of continuous operation of one of the two rocker arrangements, prior to activating the second rocker arrangement the first rocker arrangement is activated.

If in this document there is a reference to the ability, using the hinge mechanism, to open an aircraft door in a controlled manner from a home position to a final position, this of course also means that the hinge mechanism according to the invention makes it possible to move the aircraft door from the final position back to the home position. As explained above, the first rocker arrangement has been designed such that by means of its activation the aircraft door is displaceable, from an initial position, in the direction of the fuselage. However, displaceability in the direction of the aircraft fuselage does not just refer to the aircraft door being able to be displaced in longitudinal direction of the fuselage; instead, displacement in the direction of the fuselage also means that the door can be displaced almost tangentially in circumferential direction and essentially parallel to the surface of the fuselage. In other words, the aircraft door is displaceable in the direction of the fuselage surface.

Where in the above explanations of the hinge mechanism according to the invention it was stated that the second rocker arrangement is linkable to the fuselage, the term "fuselage" has to be interpreted in its widest sense, comprising not only the tubular fuselage structure composed of ribs, stringers and an exterior skin; instead the term "fuselage" also refers to any other structural component such as for example transverse ceiling supports and the like, that can serve as attachment- and storage surface for the hinge mechanism.

When activating the second rocker arrangement, it will, as a rule, not rotate on a fixed rotary axis but instead on a virtual polar axis that can be displaced to a limited extent as the door moves to its final position.

As a result of the combined displacement and swivel movement that the hinge mechanism according to the invention is able to enforce in a controlled manner it is possible to slightly displace a door from a locked position, in which it fits with a positive fit in a door aperture of a fuselage, in the direction of the fuselage and then, starting from this position, to swivel it out of the fuselage to an unlocked position in a final position. In this final position the aircraft door can, for example, be inclined downwards so that in an emergency case the door can be used by passengers as an evacuation slide.

The kinematic design of the hinge mechanism and in particular the interaction of the first rocker arrangement and the second rocker arrangement makes it possible for the hinge mechanism to be operated only at a single point in order to move an aircraft door from its initial position to its final position in a controlled manner. In this arrangement, operation can, for example, take place on one of the two rocker arrangements, for example in the form of a continuous torque impingement, without the need for active switching over of the force transmission from the first rocker arrangement to the second rocker arrangement. Instead, during the movement from a home position to a final position, activation of the first rocker arrangement always takes place first, while activation of second rocker arrangement only takes place after the first rocker arrangement has ceased to operate, for example after it has come to rest against an end stop, as a result of which the forces resulting from force impingement are transferred to the second rocker arrangement. Correspondingly, an end stop can be provided which during the movement from the final position to the home position first blocks the first rocker arrangement in order to subsequently release said first rocker arrangement when the second rocker arrangement has ceased active operation.

According to a special embodiment the first rocker arrangement comprises a first displacement link that is linkable to the aircraft door, as well as a second displacement link that is linkable to the aircraft door. These two links are named according to their function, according to which these links are designed and equipped to displace an aircraft door in the direction of a fuselage. Furthermore, the second rocker arrangement comprises a first swivel link that is linkable to the fuselage, a second swivel link that is linkable to the fuselage, as well as a connecting link. The two swivel links also are named according to their function, according to which these links are designed to swivel an aircraft door from the fuselage to a final position, around a polar axis that is aligned perpendicular to the direction of displacement.

In order to produce a functional link system the first displacement link is coupled to the first swivel link indirectly by way of the connecting link, while the second displacement link is coupled directly to the second swivel link. In other words the first and the second swivel link are likable to a first end on the fuselage and the first and the second displacement links are also likable on a first end to an aircraft door so that the second end of the first displacement link and the second end of the swivel link can be coupled to each other by way of the connecting link, and the second end of the second displacement link and the second end of the second swivel link can be connected to each other directly. Thus the first displacement link, the connection link and the first swivel link are connected in series thus forming a first link train, and the second displacement link and the second swivel link are connected in series thus forming a second link train.

In order to, in this arrangement, to attune the movement of the second link train to the movement of the first link train or vice versa, the first link train is kinematically coupled to the second link train by way of a coupling link, wherein this coupling, in particular between the first swivel link and the second swivel link, can take place by way of the coupling link.

In order to achieve the cycled movement sequence mentioned above, according to which sequence activation of the second rocker arrangement only takes place after activation of the first rocker arrangement, the first and/or the second displacement link is limited in its freedom of movement so that the second rocker arrangement is only activated after this freedom of movement has been completely exhausted, when the first rocker arrangement has ceased active operation, for example after it has come to a halt on an end stop, as a result of which forces that result from force impingement are transferred to the second rocker arrangement. In other words, the first or the second displacement link must have displaced the aircraft door from its home position in the direction of the fuselage so that activation of the second rocker arrangement can be activated as a result of further continuous operation of one of the two rocker arrangements.

Since aircraft doors that can be displaced and swivelled with the use of the hinge mechanism according to the invention can be heavy, for example 100 kg and more, at least the first rocker arrangement and/or the second rocker arrangement is designed so as to be force impinged during discrete movement phases. As a result of such force impingement, movement of the aircraft door during discrete movement phases between its home position and its final position in the direction of its movement path defined by the hinge mechanism can be supported or decelerated so that an operator who, for example, would like to manually operate the door does not have to manually start to move or decelerate the entire door weight. Thus, for example, during the displacement movement in the direction of the fuselage, a force that assists displacement can act on one of the rocker arrangements in order to influence this movement in a supportive way so as to compensate for the heavy weight of the door, in particular if one or several of the links of the hinge mechanism (first displacement link, second displacement link, first swivel link, second swivel link, connecting link and coupling link) are force impinged during discrete movement phases.

Such force impingement can be achieved with any desired mechanical, hydraulic, pneumatic, electromechanical or other drives, as well as by a combination of the above-mentioned drives; these drives being well known to the average person skilled in the art. Furthermore, force impingement can be implemented by way of non-mechanical reversible energy storage devices, for example storage devices that store electrical, pneumatic or hydraulic kinetic energy, for example in a mechanical spring. Yet another option of force impingement can be implemented with the use of a chemical drive, in which in one direction of movement of the hinge at first a gas overpressure is generated, which overpressure can, for example, be temporarily stored in a chemical mixture. In the other movement direction the energy stored in this way can then be converted back to mechanical energy. Force impingement itself can, for example, take place in such a way that one of the link points of one of the above-mentioned links impinged in a rotational manner by torque. As an alternative to this it is of course also possible to achieve force impingement from a linear movement, for example in that a link point of a hinge link is displaced in a translatory manner on the fuselage.

The hinge mechanism according to the invention comprises at least one indifferent equilibrium position, a so-called indifference position which is characterised in that the hinge mechanism can be moved from such a position in two directions without any forces acting from the outside. In the indifference position itself the hinge mechanism is essentially free of any forces. The characteristics of such an indifference position can be used in that force impingement in the direction of an indifference position, of which there is at least one, takes place on the hinge mechanism so that the hinge mechanism is made to move in the direction of such an indifference position.

The aircraft door according to the invention comprises at least one hinge mechanism that can comprise at least some of the above-mentioned features. With such a hinge mechanism the aircraft door can be linked, so as to be displaceable and swivellable, to a fuselage so that the aircraft door can be displaced from its home position in the direction of the fuselage, and subsequently can be hinged on a polar axis that is perpendicular in relation to the direction of displacement, from the fuselage into a final position.

While the starting point of the present invention was a hinged door that can be swivelled downwards from a fuselage, the hinge mechanism according to the invention of course is also suited to hinge an aircraft door upwards or downwards or to the right or to the left. Thus the hinge mechanism according to the invention can, for example, be linked to a foot region, a head region or a side region of the aircraft door.

According to a particular embodiment of the invention, the hinge mechanism, of which there is at least one, can be linked to the foot region of the aircraft door so that the aircraft door can be hinged downwards from the fuselage in the manner of a hinged door. In this case the inside of the aircraft door can be a sliding surface so that the aircraft door in its hinged-out position (final position) can be used as an evacuation slide.

As has been explained in detail in the passages above, the hinge mechanism according to the invention makes it possible to cause an aircraft door to make a combined displacement and swivel movement. The movement path of an aircraft door, which movement path can be achieved in this way, can be utilized to realize the aircraft door as a complete plug-type door. To this effect, the door comprises a multitude of cams along its lateral faces. Accordingly, the door reveal of the fuselage, into which door reveal the door is to be fitted, comprises corresponding cams that can be held from behind by means of the combined displacement and swivel movement that can be generated with the hinge mechanism. It is thus not necessary to provide a separate locking mechanism because in this position, held from behind, of the cams the aircraft door is safely fitted in the door reveal.

The fuselage according to the invention comprises at least one aircraft door, which, by means of at least one hinge mechanism with at least some of the above-described features is linked to the fuselage so as to be displaceable and swivellable in such a way that the aircraft door can be displaced from its home position in the direction of the fuselage, from which position the aircraft door can be swivelled on a polar axis that is aligned perpendicularly in relation to the direction of displacement, from the fuselage into a final position.

Finally, the invention provides for the use of a hinge mechanism with the above-described features so as to displaceably and swivellably affix an aircraft door to a fuselage.

BRIEF DESCRIPTION OF THE DRAWINGS

Below, the present invention is explained in more detail with reference to an exemplary embodiment that is depicted in the enclosed figures.

Throughout all the figures, the same or corresponding reference signs are used for identical or similar elements. The illustrations in the figures are not necessarily to scale, but they indicate qualitative size relationships.

DESCRIPTION OF PREFERRED EMBODIMENTS OF THE INVENTION

Figure 1:
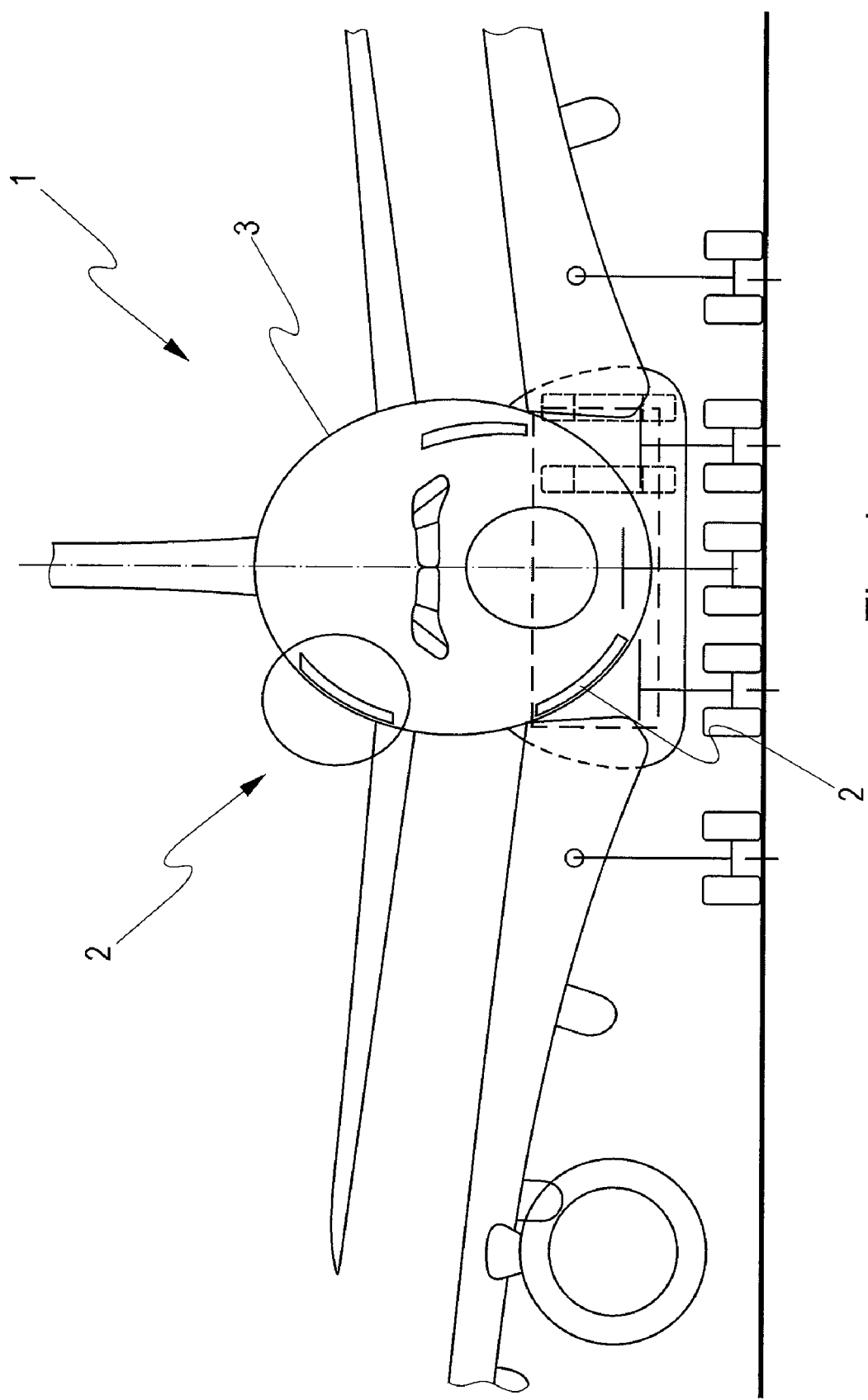
FIG. 1 shows a front view of an aircraft with two aircraft doors according to the invention fitted in the fuselage.

FIG. 1 shows a front view of an aircraft 1 with a fuselage 3 into whose exterior skin two aircraft doors 2 according to the invention have been fitted, as explained in detail below.

Figure 2:
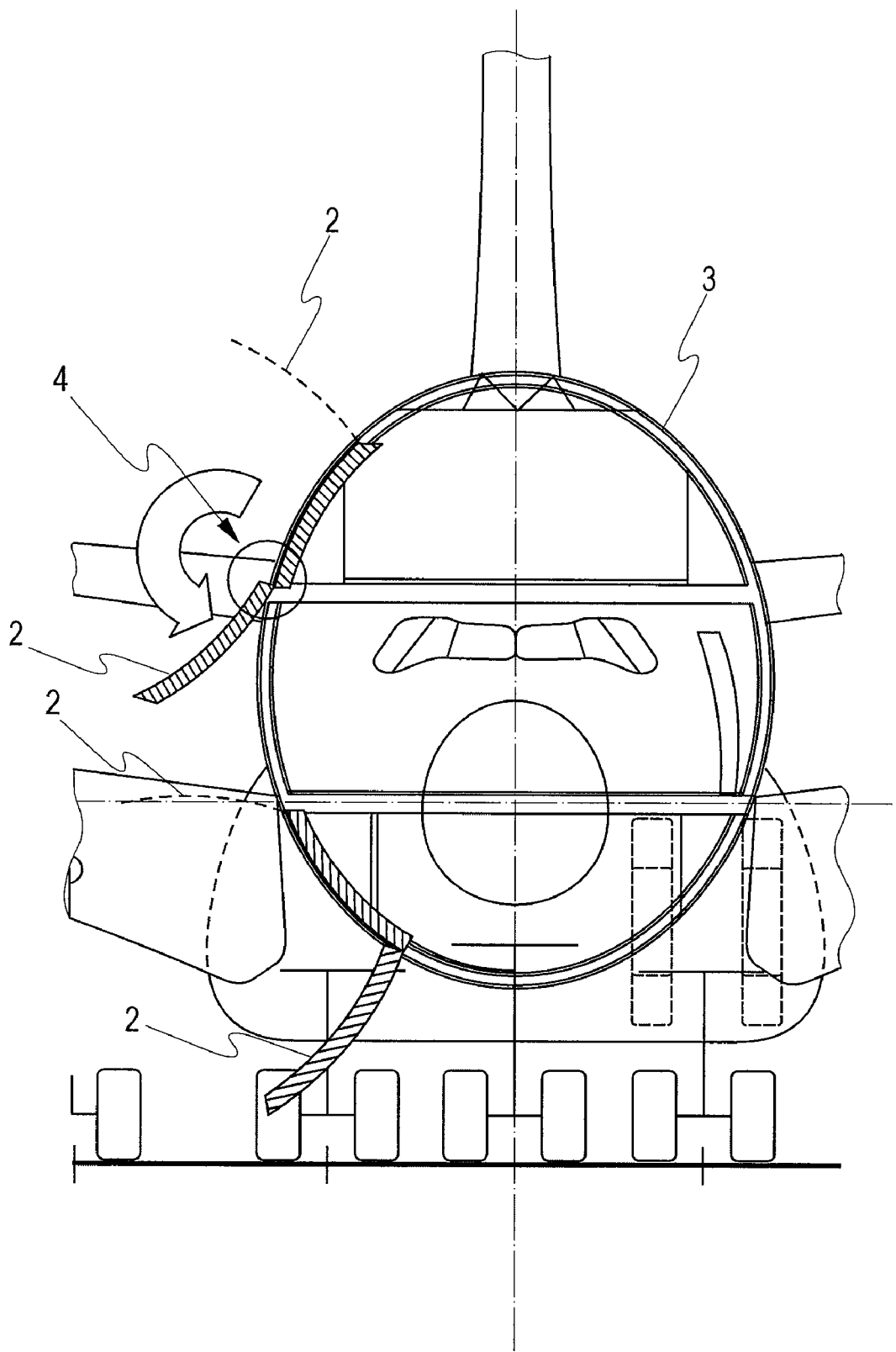
FIG. 2 shows an enlarged sectional view of FIG. 1 with two aircraft doors according to the invention.
Figure 3:
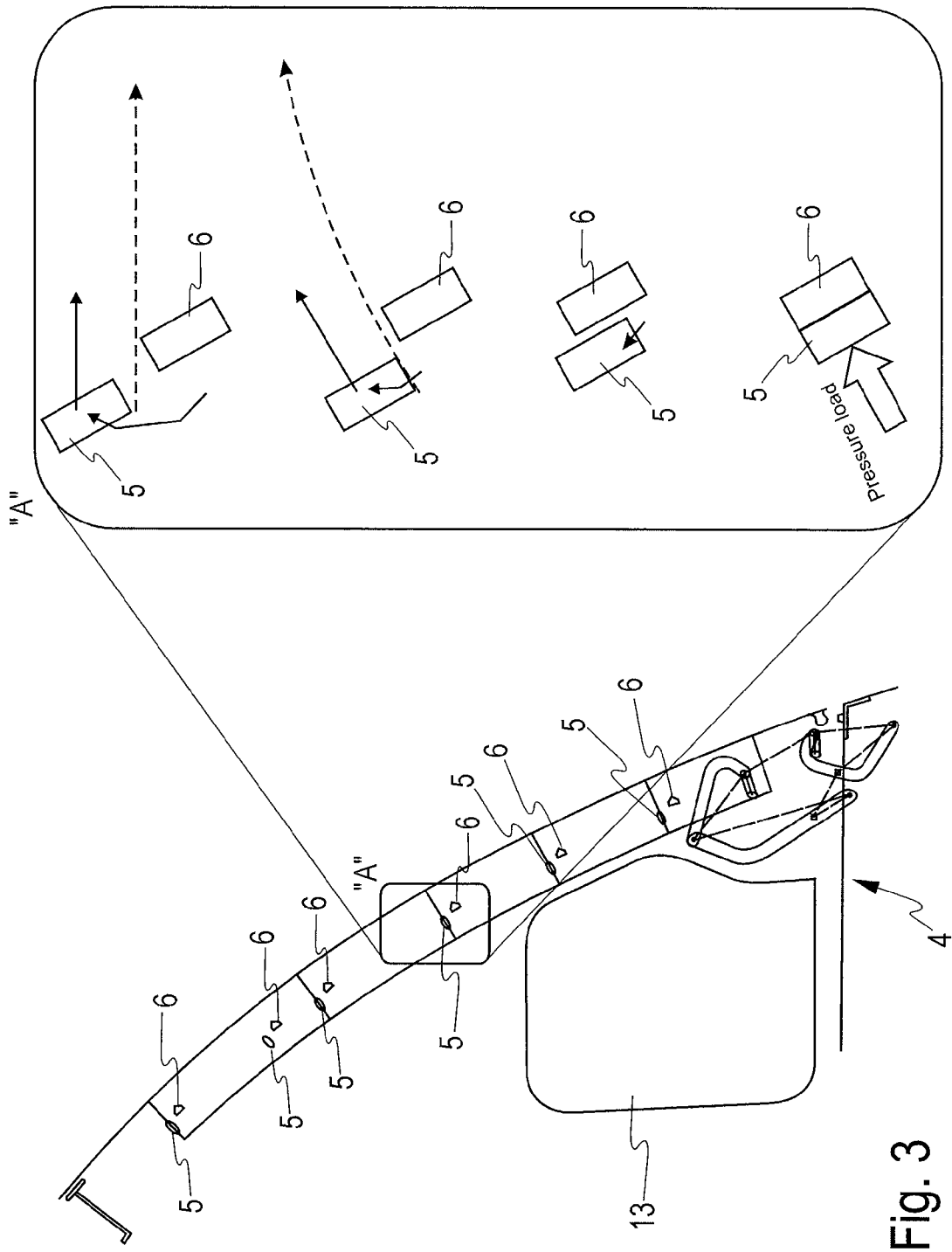
FIG. 3 shows a cross section of an aircraft door fitted in a fuselage.

FIG. 2 shows an enlarged cross section of the aircraft fuselage of FIG. 1 in the region of the aircraft doors 2 according to the invention. The fuselage 3 is horizontally partitioned into three decks, of which, for example, the upper deck as well as the middle deck can be used as passenger cabins while the lower deck can be used as a cargo hold. As shown in FIG. 3, the upper deck of the fuselage 3 comprises an aircraft door 2, which, as indicated by the arrow, can be hinged open from a closed position, in which it fits into the fuselage, to an open position. Instead of hinging the aircraft door 2 downwards as shown, with the use of the hinge mechanism according to the invention it would also be possible to design the aircraft door 2 so that it hinges upwards. Analogous to the upper deck, also the cargo hold comprises an aircraft door 2 according to the invention, which, depending on the arrangement of the hinge mechanism according to the invention, can be designed so as to either hinge upwards or hinge downwards.

FIG. 3 shows a cross section of an aircraft door according to the invention, including a hinge mechanism 4 according to the invention. The lateral face of the aircraft door comprises a multitude of cams 5 that protrude from the lateral face of the aircraft door from the drawing plane into the depth. Correspondingly, the door reveal provided in the fuselage 3 also comprises a multitude of cams 6 which protrude from the drawing plane outward towards the front. The number of the cams 6 in the door reveal matches with the number of the cams 5 on the face of the aircraft door, so that each cam 5 is associated with a cam 6. In a completely closed door position, the cams 5 hold the cams 6 from behind, as shown in the lowermost diagram of the zoomed section A. In that each cam 5 comes to rest, as shown in the diagram, behind a cam 6, against said cam 6, it can be ensured that due to the overpressure present in the passenger cabin the door 2 is pushed radially outwards, as a result of which the cams 5 exert pressure onto the cams 6. As a result of the friction engagement and/or positive locking engagement the door 2 is in a secured position, which can additionally be secured by way of locking the hinge mechanism 4 or another mechanism that kinematically interacts with the hinged mechanism 4 or with an additional separate locking mechanism.

In the sectional view shown in FIG. 3 the door 2, by means of the hinge mechanism, has already been slightly moved upwards in circumferential direction of the fuselage 3 (second diagram of section "A") so that the cams 5 of the aircraft door 2 no longer reach behind the cams 6 in the door reveal. Instead, in the position of the aircraft door 2, which position is shown in FIG. 3, a position has been reached in which the aircraft door 2 can be swivelled to the outside by means of the hinge mechanism 4 according to the invention, as is shown by the outward-directed arrows of the first and the second diagram of section "A". As will be explained in detail below, the hinge mechanism 4 according to the invention is able to cause the door 2 to make a circumferential translatory displacement movement almost tangentially in circumferential direction of the aircraft fuselage 3, and to make the subsequent movement of the aircraft door 2 radially outwards, away from the fuselage 3.

Figure 4:
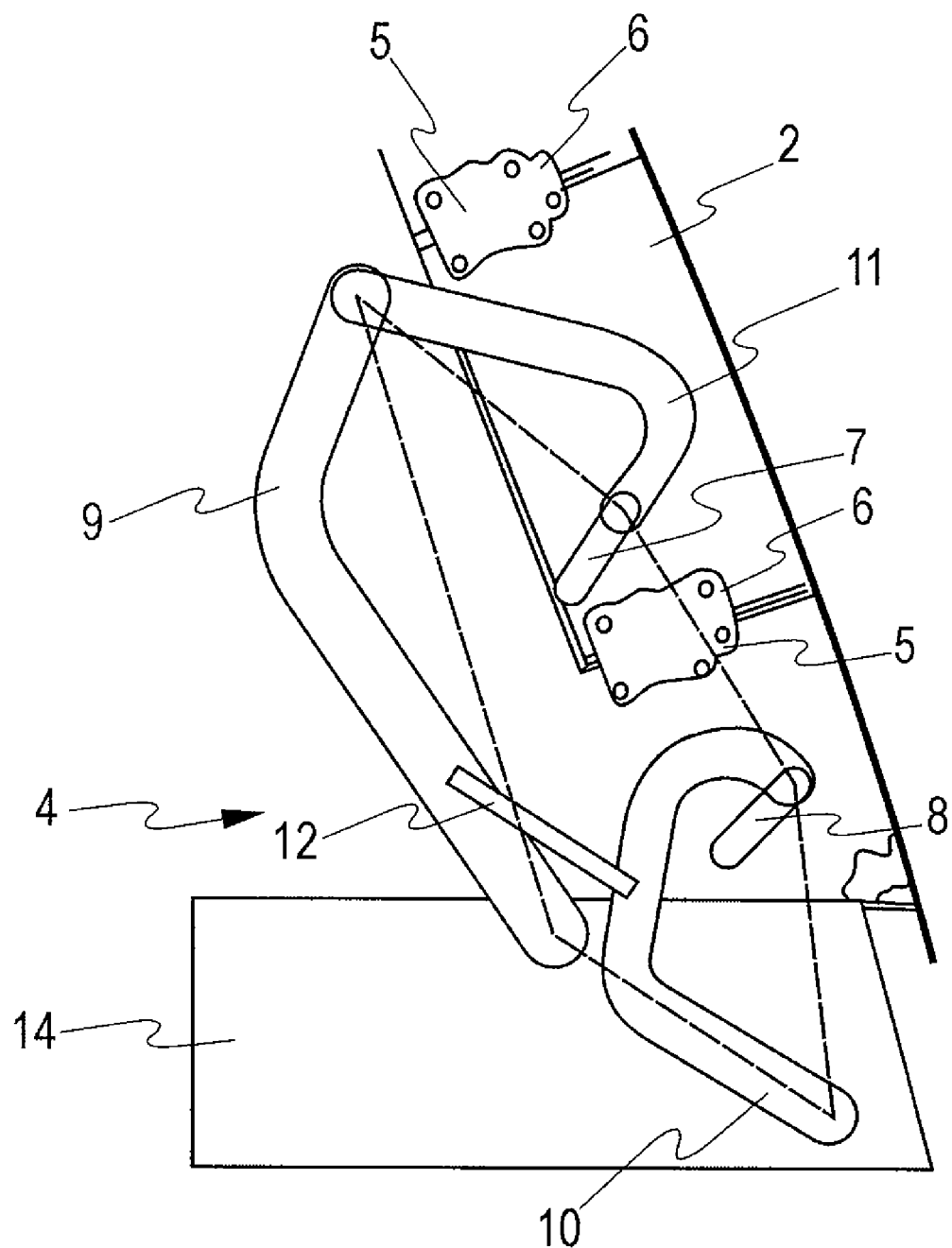
FIG. 4 shows an overview of the individual elements of the hinge mechanism according to the invention.

Below, with reference to FIGS. 4-14, the hinge mechanism according to the invention, and in particular its kinematics, are explained in more detail. FIG. 4 shows a section of FIG. 3 in the foot region of the aircraft door 2. The aircraft door 2 is connected to a transverse support 14 by means of the hinge mechanism 4 according to the invention, which transverse support, in conjunction with further transverse supports forms a floor grid for an aircraft. FIG. 4 shows the home position of the hinge mechanism according to the invention, in which cams 5 on the door completely reach behind the cams 6 on the fuselage.

The hinge mechanism 4 essentially comprises six links, which in part are interconnected among each other so as to be articulated. Thus the hinge mechanism 4 comprises two link trains, wherein a first link train is formed by a first displacement link 7, a connection link 11 as well as a swivel link 9. A second link train is formed by the second displacement link 8 as well as by the second swivel link 10. As shown in FIG. 4, one end of both the first swivel link 9 and the second swivel link 10 is attached to the transverse support 14 of the floor grid. On the other end of the first swivel link 9 the connecting link 11 is affixed so as to be articulated, which connecting link 11 is used for kinematically coupling the first swivel link 9 to the first displacement link 7, one end of which in turn is connected to the aircraft door 2 so as to be articulated. In contrast to this the second swivel link 10 is directly connected to the second displacement link 8, which in turn is affixed to the door 2 so as to be articulated.

In order to achieve kinematic forced coupling of the two link trains 7, 9, 11 and 10, 8, the first swivel link 9 is connected to the second swivel link 10 by way of a coupling link 12 in an articulated manner. As will be shown below with reference to the further figures, the two displacement links 7, 8, which in the context of the present invention are also referred to as rocker arrangements, are used to displace the aircraft door 2 from its home position (as shown in FIG. 4) in the direction of the fuselage. In contrast to this, the further links 9, 11, 10, which in the context of the present invention are also referred to as the "second rocker arrangement", are used to swivel the aircraft door 2 out of the fuselage 3, on a polar axis that is aligned perpendicularly in relation to the displacement direction, into a final position.

Figure 5:
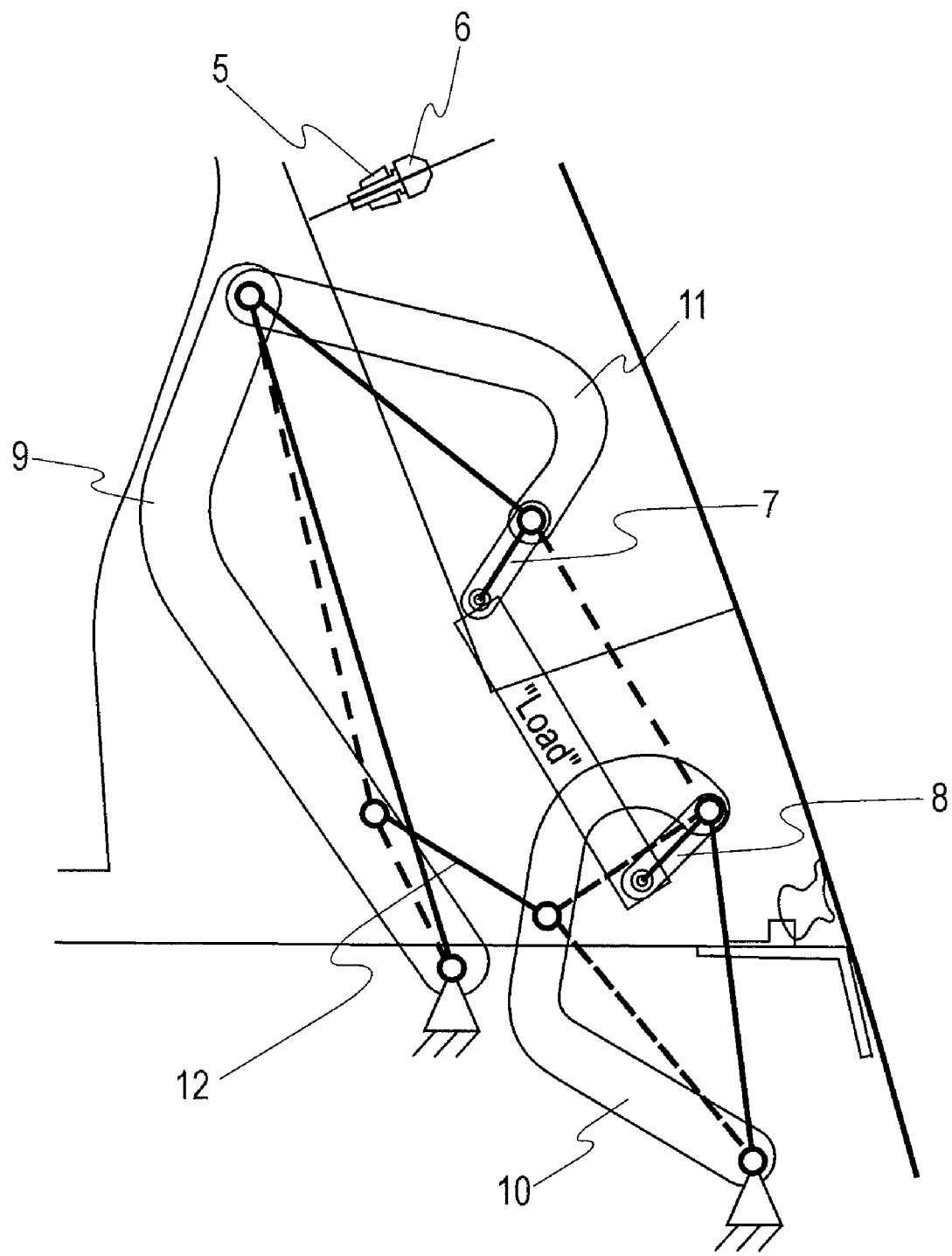
FIG. 5 illustrates the kinematic system on which the hinge mechanism according to the invention is based.

To provide a better understanding of the kinematics of the hinge mechanism 4, FIG. 5 shows the kinematics system on which said hinge mechanism 4 is based. Although in particular the links 9, 11, 10 are of a shape that is specially arranged at right angles, the hinge mechanism 4 can be simplified in the form of the kinematics disc system of FIG. 5.

Figure 6A:
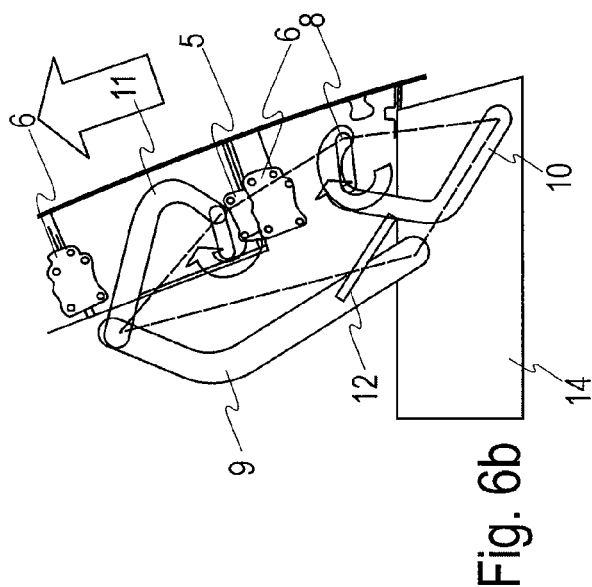
FIG. 6 in FIGS. 6a to 6d roughly illustrates four movement states of the hinge mechanism according to the invention.
Figure 6B:
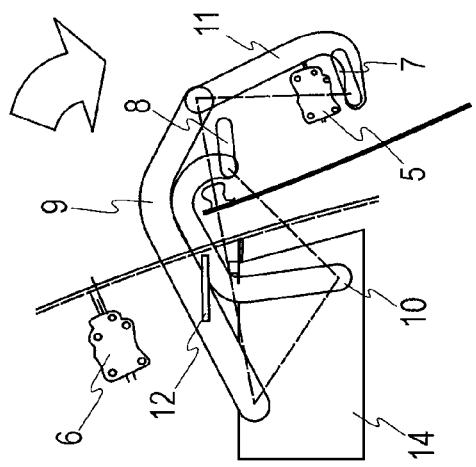

Below, with reference to FIGS. 6a-6d the kinematic and the movement sequence of the hinge mechanism according to the invention during different movement states is explained. As shown in FIG. 6a, the aircraft door 2 is in a closed position in which it forms part of the exterior skin of the fuselage 3. With the door 2 in this position, the hinge mechanism is in its home position in which the cams 5 on the door completely reach behind the cams 6 on the fuselage. In order to unlock the position of the aircraft door 2, which position is shown in FIG. 6a, the first rocker arrangement of the two displacement links 7, 8 is activated in that at least one of the two displacement levers 7, 8 is rotated clockwise, to a certain extent, by force impingement. By means of such activation of the displacement links 7, 8 the door 2 is slid upwards in circumferential direction of the fuselage 3, as indicated in FIG. 6b by the arrow, so that the cams 5 no longer reach behind the cams 6 on the fuselage, and thus the door is released for hinging open towards the outside. In the position shown in FIG. 6d the displacement links 7, 8 have reached their final position in relation to the aircraft door 2, which position in relation to the aircraft door 2 they will not leave during further movement phases. The freedom of movement of the displacement links 7, 8 in clockwise direction can, for example, be delimited by end stops on the aircraft door 2 or on one of the displacement levers 7, 8 itself, as a result of which the further movement of the displacement links 7, 8 in clockwise direction is impeded. Such limitation of the freedom of movement leads to a situation in which with further force impingement of the displacement links the forces originating from force impingement are transferred to the second rocker arrangement so that said second rocker arrangement is activated.

Figure 6C:
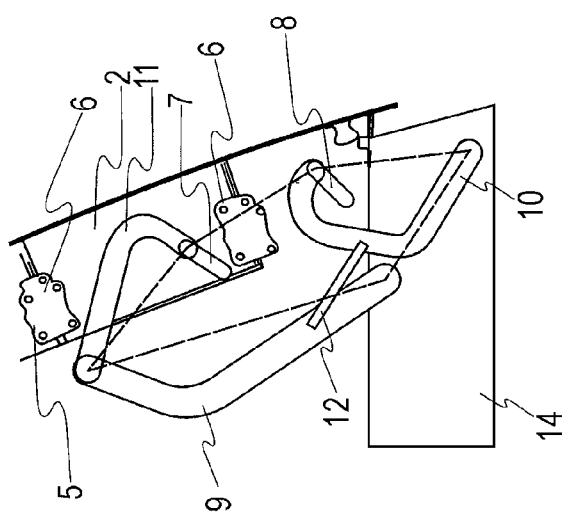

Thus, starting with FIG. 6b, the aircraft door 2 shown in FIG. 6c is already in a position hinged outwards by approximately 120°, in which position, starting with FIG. 6b, both the first and the second swivel links 9, 10 have rotated in clockwise direction. As a result of the kinematic coupling of the first swivel link 9 with the first displacement link 7, starting from FIG. 6b the connecting link 11 has rotated anticlockwise in relation to the first swivel link 9. As already mentioned, the position of the displacement links 7, 8 in relation to the aircraft door as shown in FIG. 6b has not changed in FIG. 6c.

Figure 6D:
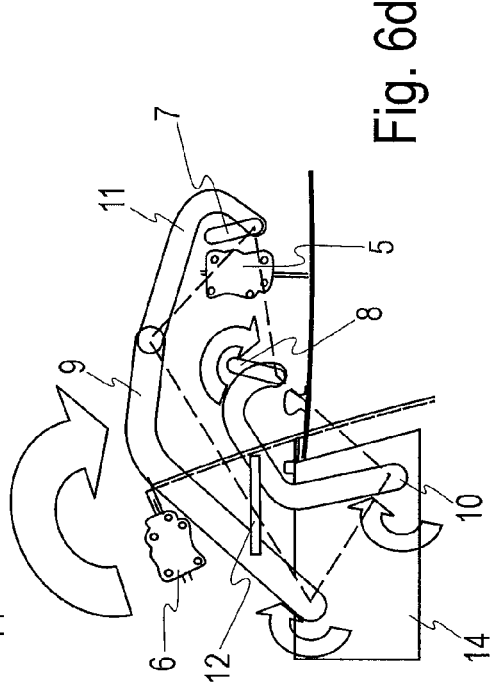

In FIG. 6d the aircraft door together with the hinge mechanism 4 has reached its final position in which it has been hinged from its home position (FIG. 6a) outwards by approximately 180°. In this position, too, the position of the displacement links 7, 8 in relation to the aircraft door has not undergone any further change so that for further movement of the door only the kinematics of the links 9, 10, 11 and 12 is responsible. Thus, the first swivel link 9 and the second swivel link 10 have further moved clockwise, wherein starting from FIG. 6c in the transition to FIG. 6d also the connecting link 11 has now moved clockwise. As shown in FIG. 6d, in this final position the first swivel link 9 rests against the second swivel link 10, as a result of which, for example, further movement of the door can be inhibited. It would thus, for example, be possible to design the first swivel link 9 as a stepping board so that this stepping board during the entire swivel movement covers the hinge mechanism 4 as far as possible, so as to prevent possible injury.

In order to operate the hinge mechanism 4 it is, for example, possible to impinge one of the linkage points of the displacement links 7, 8 with torque with the use of a drive means such as for example an electric motor, a hydraulic motor, a spring drive or merely a manual operation. Such torque impingement on one of the displacement links 7, 8 can be continuously maintained during the entire movement sequence of the aircraft door 2 from its home position into its final position so as to generate the swivel movement, because, due to the kinematics of the hinge mechanism, the first rocker arrangement 7, 8 is always fully activated first until its freedom of movement is completely exhausted, before force impingement is transferred from one of the displacement links 7, 8 to the remaining links, 9, 10, 11, 12 so as to activate said links.

Since the hinge mechanism 4 according to the invention can be in at least one indifference position it can be advantageous if one or several linkage points of the hinge mechanism are provided with torsion springs so as to in this way support the hinge mechanism 4 in the direction of this indifference position, as a result of which it becomes possible to at least partially compensate for the intrinsic weight of the aircraft door 2.

Figure 7:
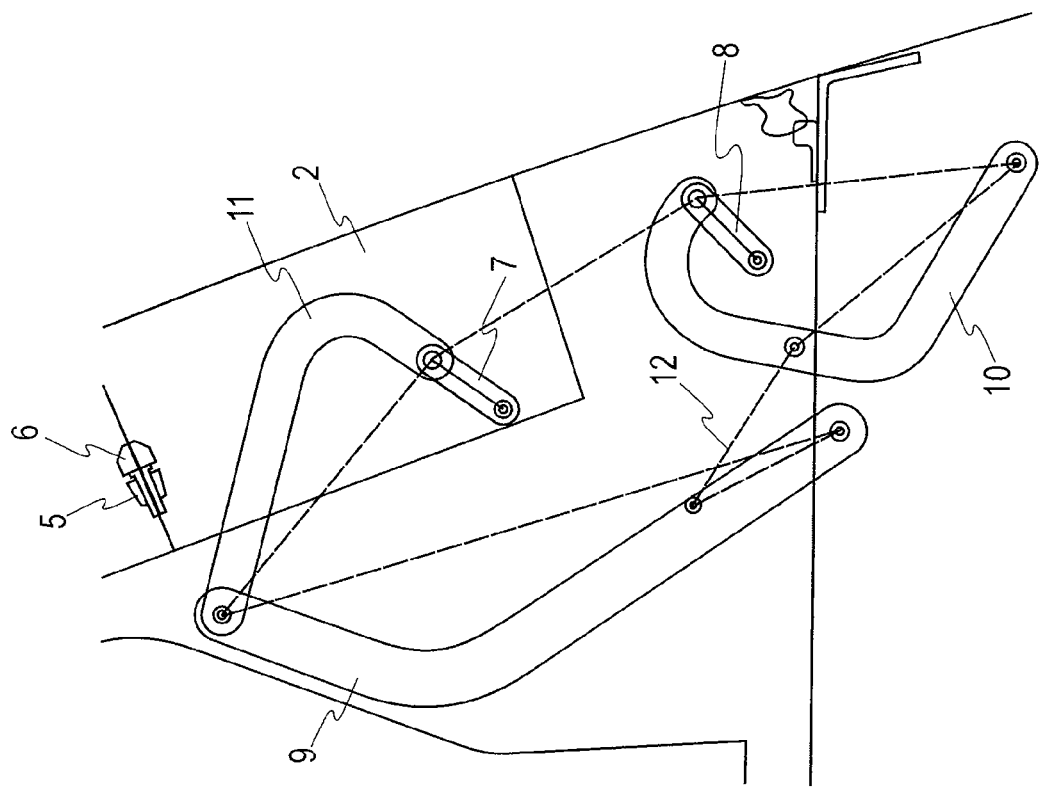
FIGS. 7-14 illustrate in detail eight movement states of the hinge mechanism according to the invention, between a home position and a final position.
Figure 7:
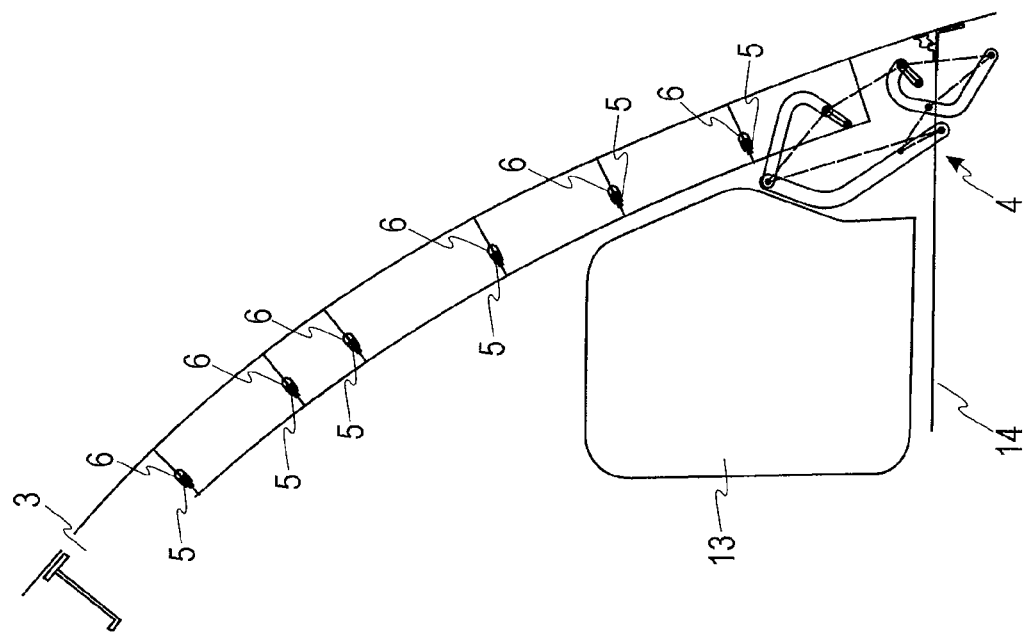
Figure 8:
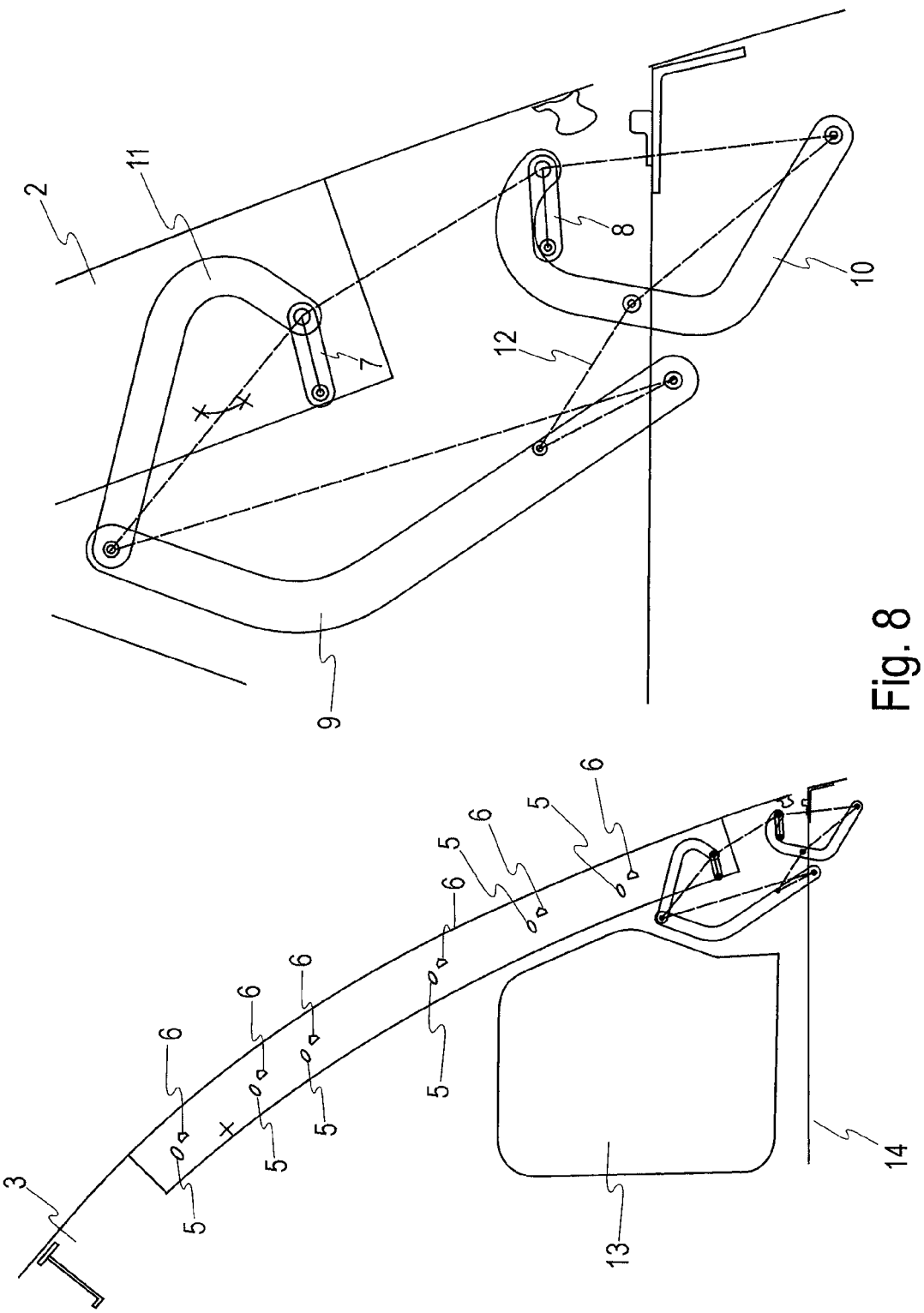

Finally, with reference to FIGS. 7 to 14, a complete movement sequence of the aircraft door 2 or of the hinge mechanism 4 is briefly described. In FIG. 7 the aircraft door is in its completely closed position in which the cams 5 on the door completely reach behind the cams 6 on the fuselage. The hinge mechanism 4 is in its home position. As shown in the left-hand diagram in FIG. 7, due to the very small dimensions of the hinge mechanism 4 it is possible to arrange a folded inflatable evacuation slide 13 very close to the foot region of the door in order to be able, in an emergency, to hinge said evacuation slide outwards together with the aircraft door. As shown in FIG. 8, starting from FIG. 7, one of the displacement links 7, 8 is impinged with torque, as a result of which said displacement links 7, 8 slightly rotate clockwise, thus causing cams 5 to move relative to cams 6 so that cams 5 no longer reach behind cams 6, the displacement links 7, 8 moving the aircraft door 2 in circumferential direction of the fuselage upwards. In this position the degree of freedom of rotation of the displacement levers 7, 8 is fully exhausted so that forces emanating from further force impingement are transferred to the second rocker arrangement.

Figure 9:
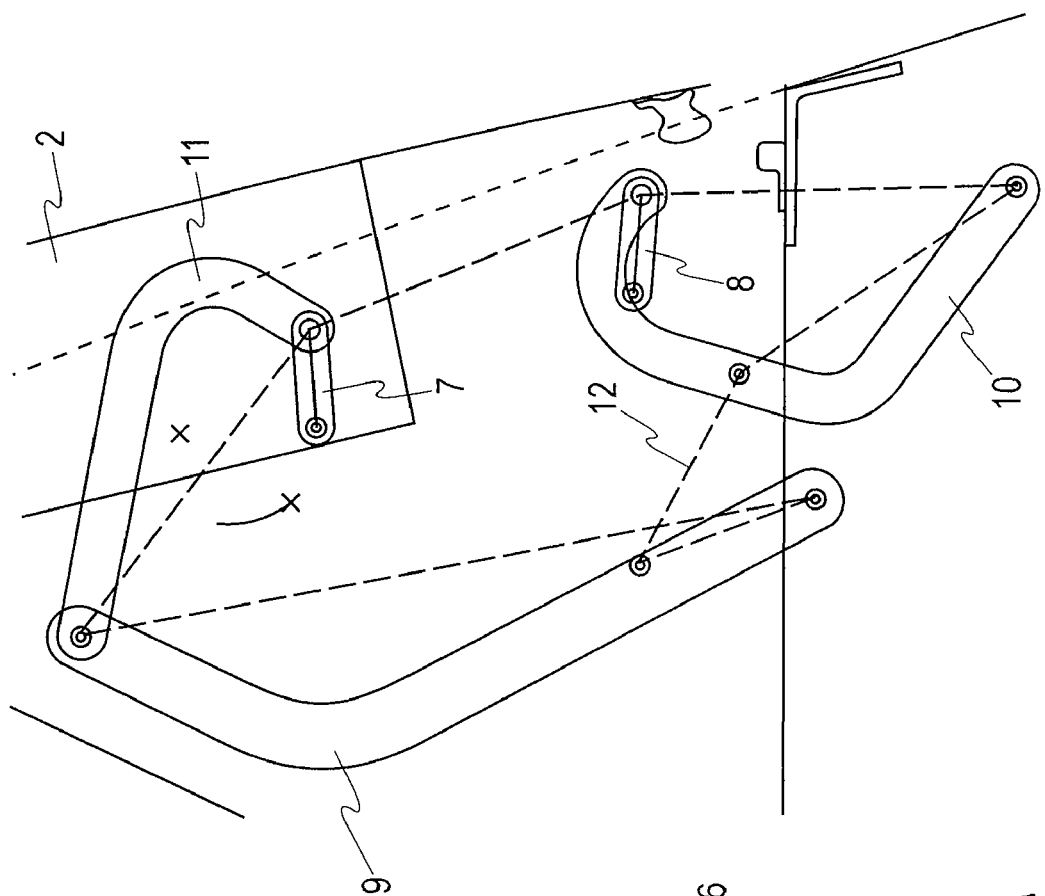
Figure 9:
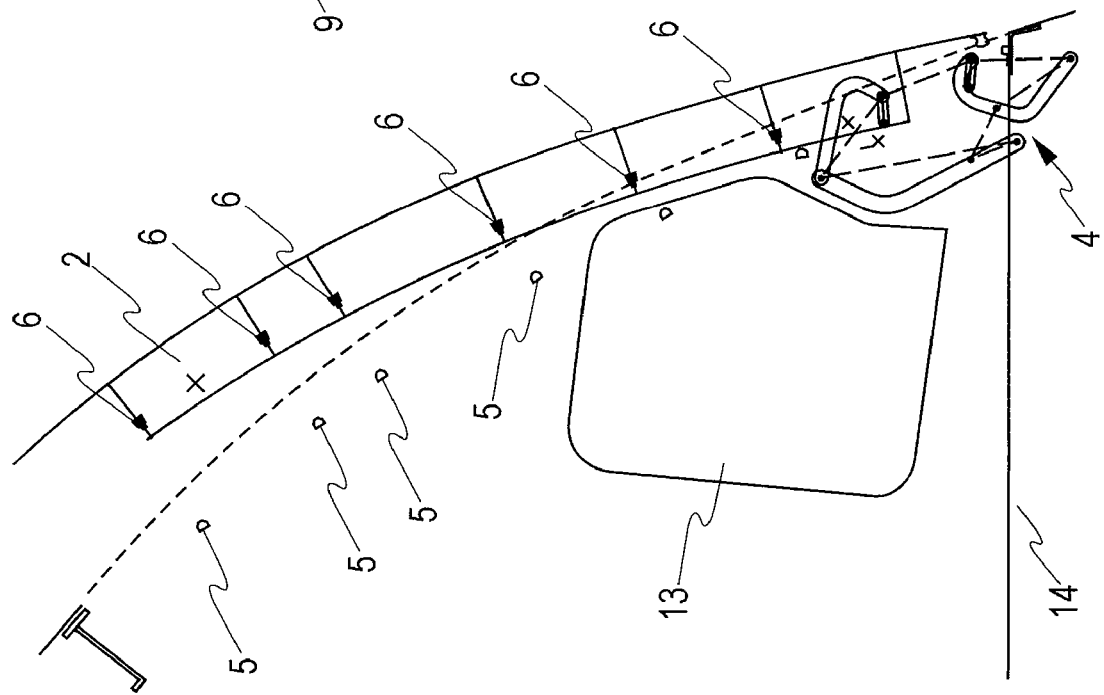
Figure 10:
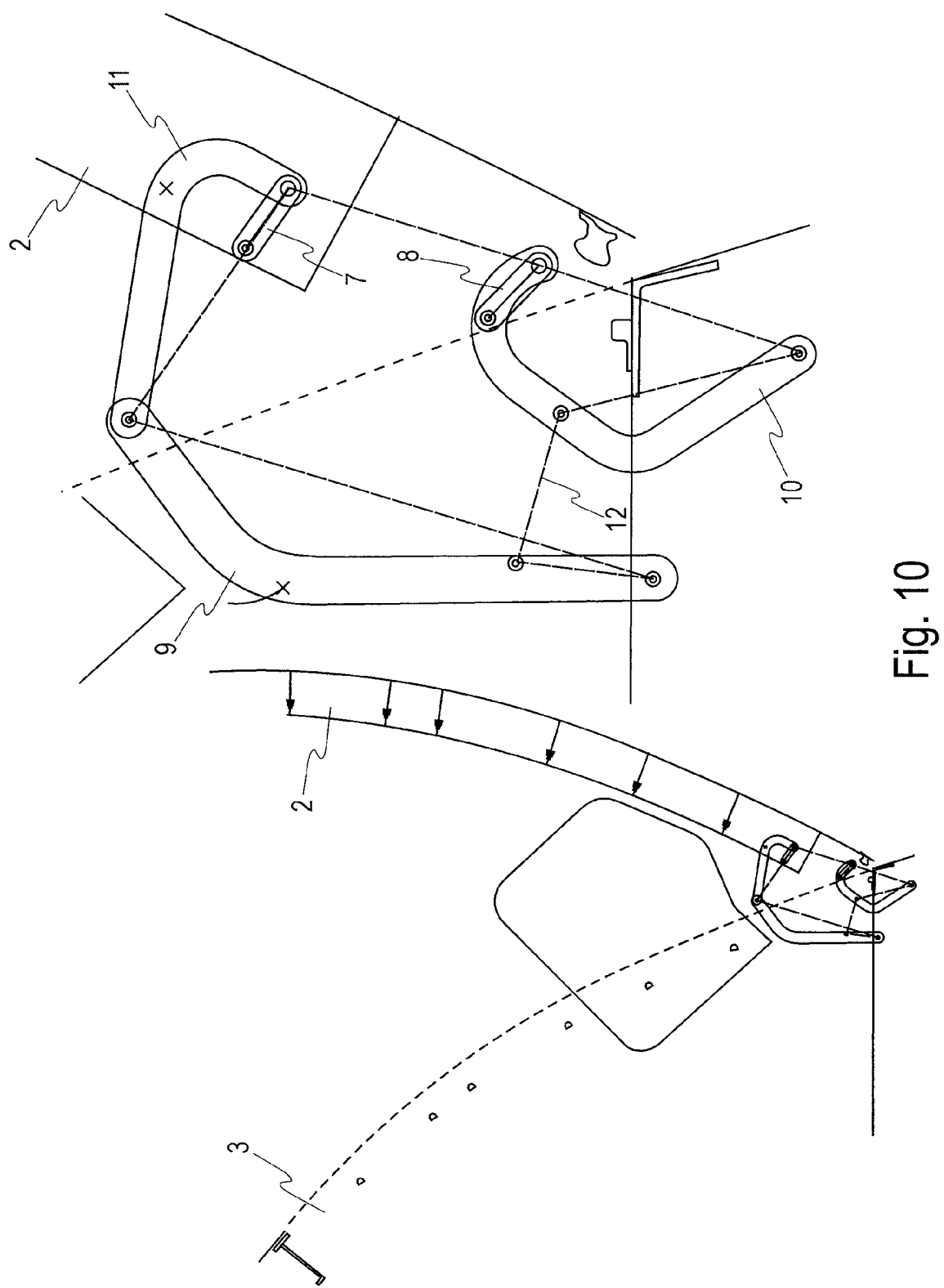
Figure 11:
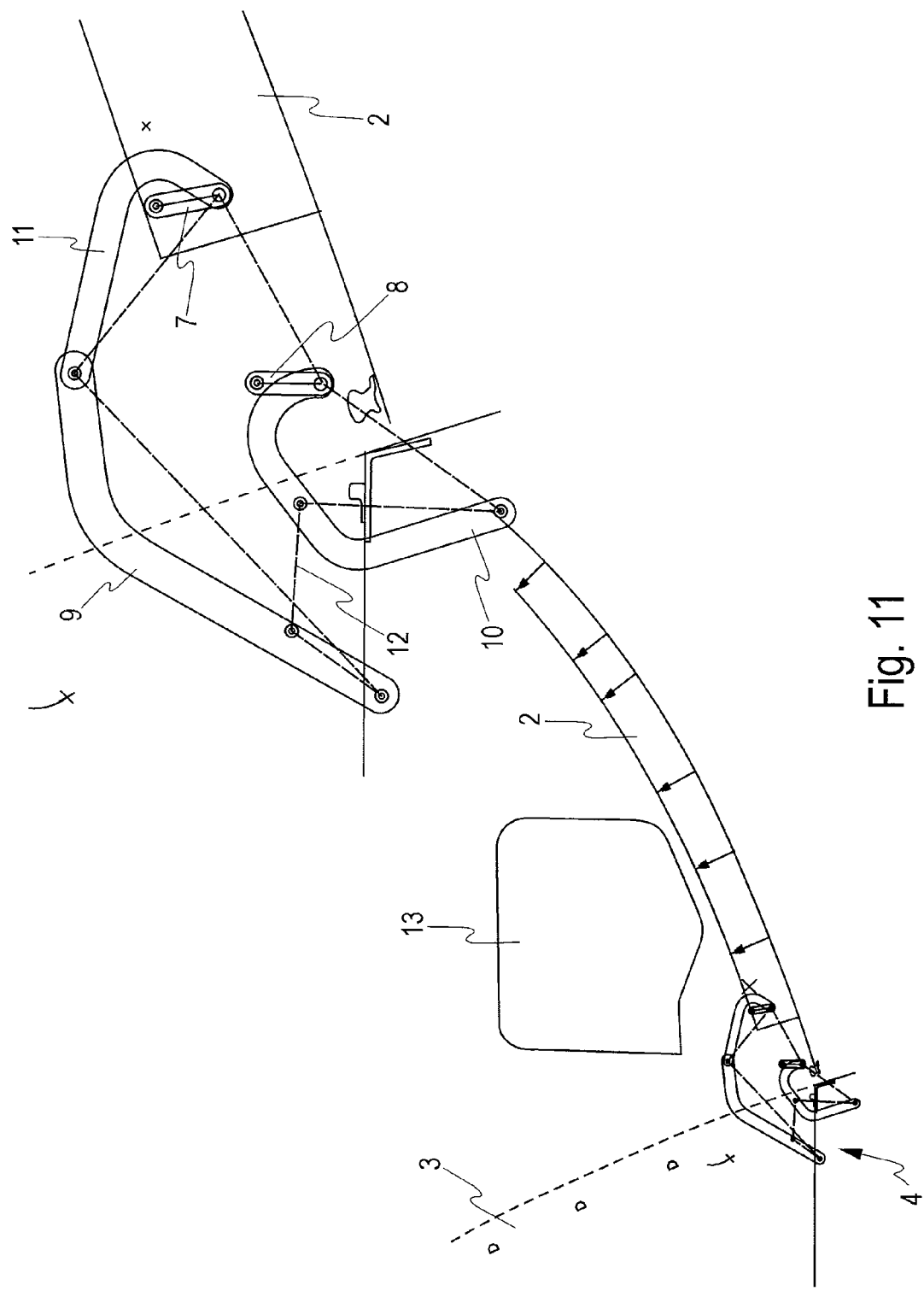
Figure 12:
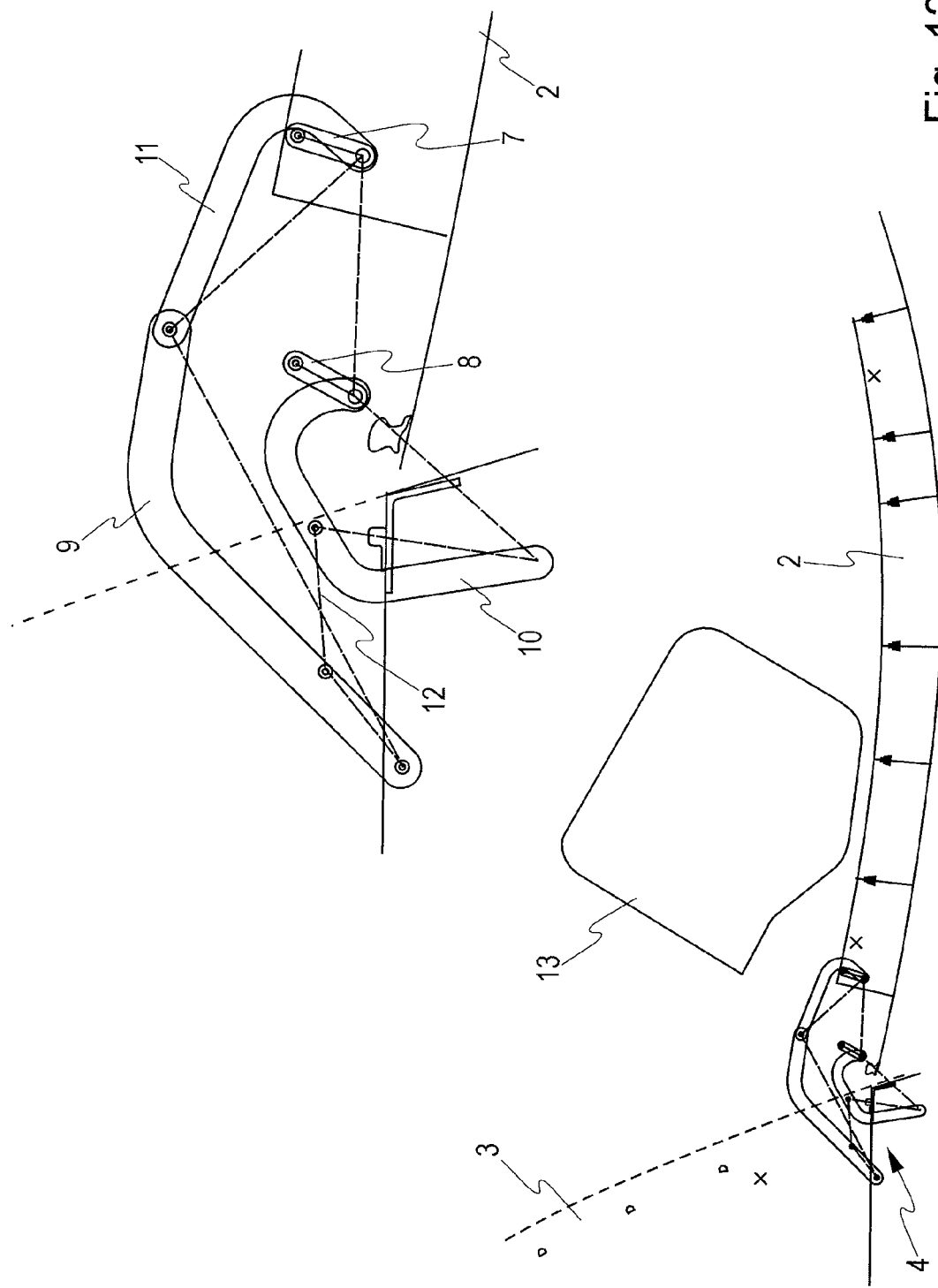
Figure 13:
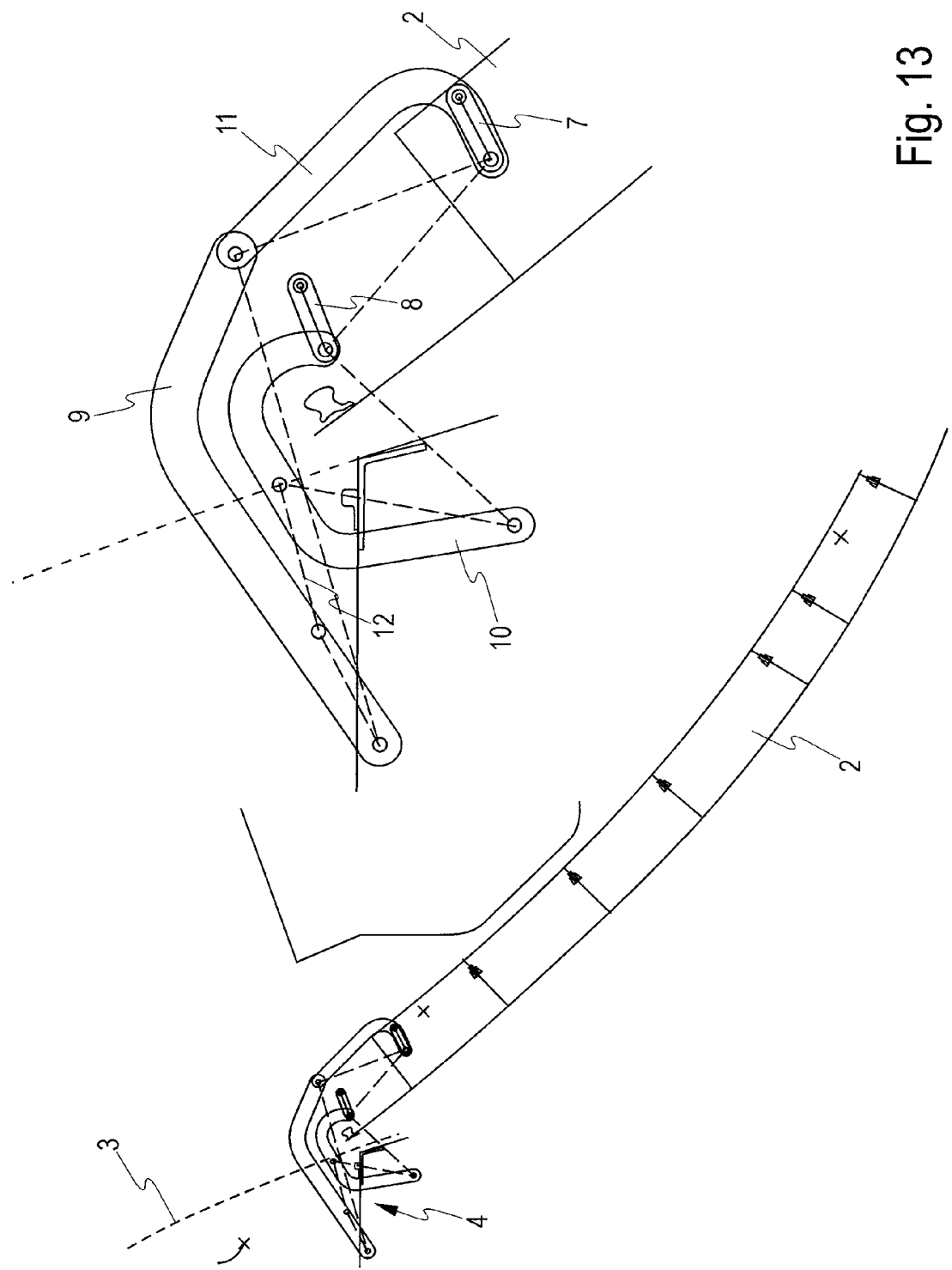

In FIG. 9 the aircraft door 2 has been hinged by approximately 15° by further force impingement on one of the two displacement links 7, 8 wherein, starting from FIG. 8, the displacement links 7, 8 have, however, not further rotated in relation to the aircraft door 2. As can be derived from the left-hand diagram of FIG. 9, the evacuation slide 13 is attached to the aircraft door 2 so that said evacuation slide 13 can be moved outwards together with the aircraft door 2.

FIGS. 9, 10, 11, 12, 13 and 14 show various swivel positions of the aircraft door 2 or of the hinge mechanism 4 according to the invention, in which positions the door has been swivelled out by 15°, 60°, 100°, 120°, 160° and 180° from its home position. During all these movement phases the position of the displacement links 7, 8 in relation to the aircraft door 2 no longer changes. In FIGS. 9-14 the two swivel links 9, 10 rotate throughout in clockwise direction, whereas due to the kinematics of the hinge mechanism, the displacement link 11, starting from the position of FIG. 9 to the position of FIG. 12, moves anticlockwise in relation to the first swivel link 9. However, from the 120° position of FIG. 12 the displacement link 11 also moves clockwise, as result of which final lowering of the aircraft door 2 is achieved.

Figure 14:
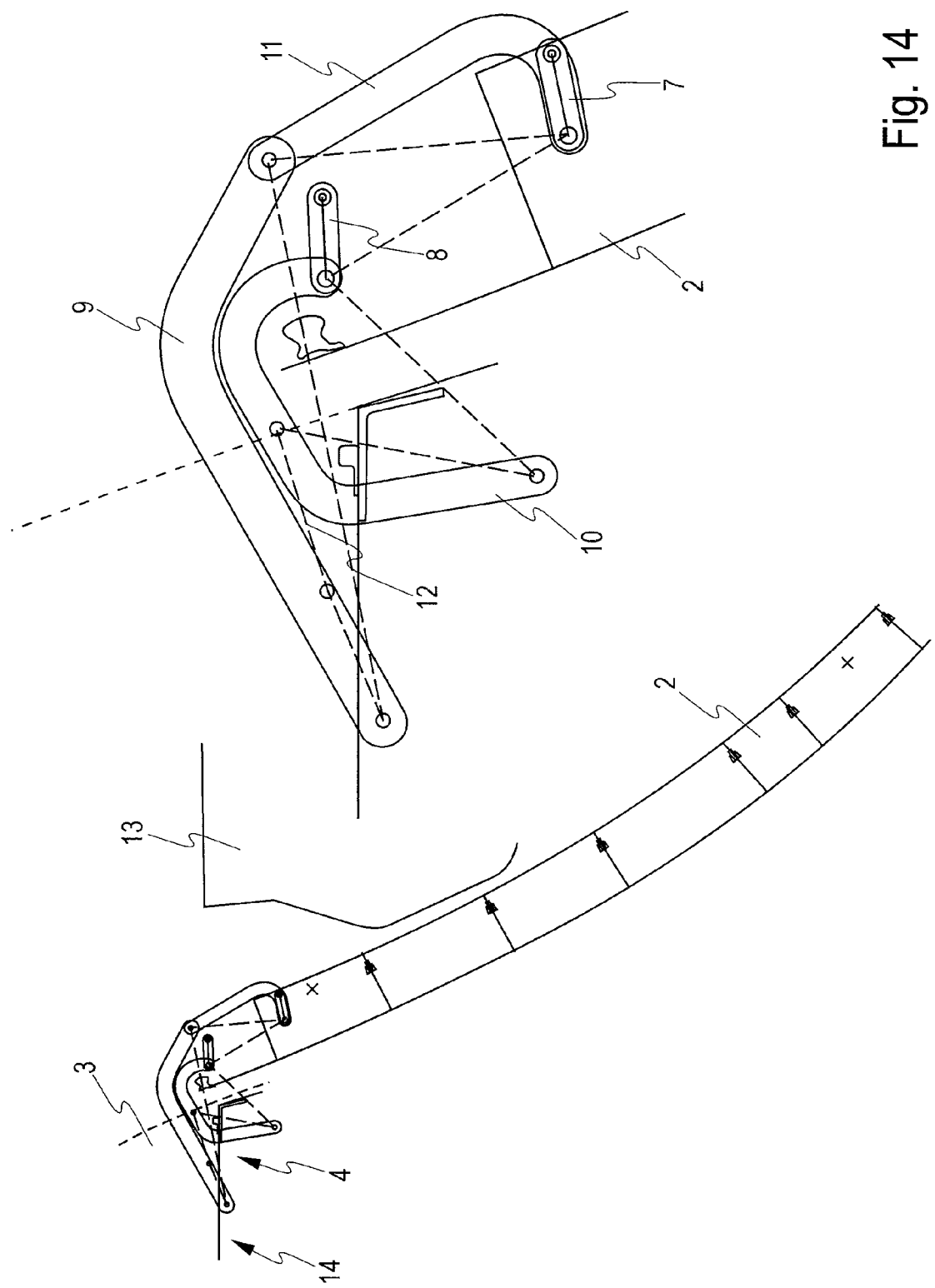

Finally, as partly shown in FIG. 14, the evacuation slide 13 is in the fully hinged-open position of the door 2 on the now outward-facing inside of the aircraft door 2 so that the aircraft door can be used as a support for the evacuation slide 13 in an inflated state.

What is claimed is:

1. A hinge mechanism for the displaceable and swivellable installation of an aircraft door, which can be fitted to a fuselage, in said fuselage, comprising:

a first rocker arrangement comprising a first displacement link and a second displacement link, the first rocker arrangement being linkable to the aircraft door and being kinematically designed such that as a result of its activation the aircraft door is displaced circumferentially from its locked position in a direction almost tangential to a circumferential direction of the fuselage, defined by the outer surface of the fuselage, so that the door is unlocked; and a second rocker arrangement comprising a first swivel link and a second swivel link, the second rocker arrangement being linkable to the fuselage and being kinematically designed such that as a result of its activation the aircraft door can be swivelled from the unlocked position to a final position, around a polar axis that is aligned perpendicular to the direction of displacement;

wherein the first rocker arrangement kinematically interacts with the second rocker arrangement in such a way that as a result of continuous force impingement on one of the two rocker arrangements, the first rocker arrangement moves through its complete range of motion relative to the aircraft door and afterwards the second rocker arrangement moves through its complete range of motion relative to the aircraft door such that the first rocker arrangement stops moving relative to the aircraft door before the second rocker arrangement starts moving relative to the aircraft door.

2. The hinge mechanism of claim 1, wherein at least the first rocker arrangement has a limited degree of freedom of movement so that when this limited degree of freedom of movement is exhausted any further forces emanating from further force impingement are transferred to the second rocker arrangement.

3. The hinge mechanism of claim 1, wherein the hinge mechanism can be in at least one indifference position in whose direction the hinge mechanism is made to move as a result of force impingement.

4. The fuselage of claim 1 being fitted with at least one aircraft door of claim 1, at least one hinge mechanism of claim 1 being linked to the fuselage so as to allow the at least one aircraft door to be displaceable and swivellable such that each of the at least one aircraft door can be displaced from its locked position in the direction almost tangential to the circumferential direction of the fuselage and swivelled around the polar axis, that is aligned perpendicularly to the direction of displacement, from the fuselage to the final position.

5. The use of at least one hinge mechanism of claim 1 in order to, with it, affix the aircraft door of claim 1 displaceably and swivellably to the fuselage of claim 1.

6. The hinge mechanism of claim 1, wherein the first displacement link is linkable to the aircraft door and the second displacement link is linkable to the aircraft door; and wherein the first swivel link is linkable to the fuselage, the second swivel link is linkable to the fuselage, and the second rocker arrangement further comprises a connecting link;

wherein the first displacement link is connected to the first swivel link indirectly by way of the connecting link, and wherein the second displacement link is coupled directly to the second swivel link.

7. The hinge mechanism of claim 6, wherein the first displacement link, the connecting link and the first swivel link form a first link train, and the second displacement link and the second swivel link form a second link train, wherein the first link train is kinematically coupled to the second link train by way of a coupling link.

8. The hinge mechanism of claim 6, wherein at least one of the first and/or second displacement links is limited in its freedom of movement, with the second rocker arrangement being activated after this freedom of movement has been exhausted.

9. The hinge mechanism of claim 6, wherein the first swivel link is kinematically coupled to the second swivel link by way of a coupling link.

10. The hinge mechanism of claim 9, wherein at least one of the links from the group comprising the first displacement link, second displacement link, first swivel link, second swivel link, connecting link and coupling link is force impinged during discrete movement phases.

11. The hinge mechanism of claim 1, wherein at least one of the first rocker arrangement and the second rocker arrangement is designed so as to be force impinged during discrete movement phases.

12. The hinge mechanism of claim 11,
wherein force impingement takes place by way of at least one drive from the group comprising a spring drive, electrical drive, manual drive, hydraulics drive, pneumatics drive and chemical drive.

13. The hinge mechanism of claim 11,
wherein force impingement takes place either in a linear way or in a rotational way.

14. The aircraft door of claim 1 being linkable by means of at least one hinge mechanism of claim 1, so as to be displaceable and swivellable, to the fuselage of claim 1 so that the aircraft door can be displaced from its locked position in the direction almost tangential to the circumferential direction of the fuselage, and can be swivelled around the polar axis, that is perpendicular to the direction of displacement, from the fuselage to the final position.

15. The aircraft door of claim 14,
wherein the at least one hinge mechanism is linked to a region of the aircraft door comprising a foot region, a head region and a side region of the aircraft door.

16. The aircraft door of claim 14,
wherein the aircraft door comprises a multitude of cams along its lateral faces, and wherein the fuselage comprises a door reveal with corresponding cams that can be held from behind by means of the combined displacement and swivelling movement that can be generated with the at least one hinge mechanism.

17. The aircraft door of claim 14,
wherein the at least one hinge mechanism is linked to a foot region of the aircraft door, and wherein the inside of the aircraft door is designed as a sliding surface so that the aircraft door in its final position can be used as an evacuation slide.

18. The aircraft door of claim 17
wherein the aircraft door forms a support body so that the aircraft door in its final position forms a support body for an evacuation system.

19. A hinge mechanism for the displaceable and swivellable installation of an aircraft door, which can be fitted to a fuselage, in said fuselage, comprising:
a first rocker arrangement comprising a first displacement link and a second displacement link, the first rocker arrangement being linkable to the aircraft door and being kinematically designed such that the movement of the first rocker arrangement through its complete range of motion relative to the aircraft door displaces the aircraft door circumferentially from its locked position in a direction almost tangential to a circumferential direction of the fuselage, defined by the outer surface of the fuselage, so that the door is unlocked; and
a second rocker arrangement comprising a first swivel link and a second swivel link, the second rocker arrangement being linkable to the fuselage and being kinematically designed such that the movement of the second rocker arrangement through its complete range of motion relative to the aircraft door swivels the aircraft door from the unlocked position to a final position, around a polar axis that is aligned perpendicular to the direction of displacement;
wherein the first rocker arrangement kinematically interacts with the second rocker arrangement in such a way that as a result of continuous force impingement on one of the two rocker arrangements, the first rocker arrangement moves through its complete range of motion relative to the aircraft door and afterwards the second rocker arrangement moves through its complete range of motion relative to the aircraft door.

* * * * *